US012190897B2

(12) United States Patent
Ravelli et al.

(10) Patent No.: US 12,190,897 B2
(45) Date of Patent: *Jan. 7, 2025

(54) APPARATUS AND METHOD FOR PROCESSING AN AUDIO SIGNAL USING A HARMONIC POST-FILTER

(71) Applicant: Fraunhofer-Gesellschaft zur Foerderung der angewandten Forschung e.V., Munich (DE)

(72) Inventors: Emmanuel Ravelli, Erlangen (DE); Christian Helmrich, Berlin (DE); Goran Markovic, Nuremberg (DE); Matthias Neusinger, Rohr (DE); Sascha Disch, Fuerth (DE); Manuel Jander, Hemhofen (DE); Martin Dietz, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,724

(22) Filed: May 16, 2023

(65) Prior Publication Data

US 2023/0282223 A1 Sep. 7, 2023

Related U.S. Application Data

(63) Continuation of application No. 17/144,979, filed on Jan. 8, 2021, now Pat. No. 11,694,704, which is a (Continued)

(30) Foreign Application Priority Data

Jul. 28, 2014 (EP) .................................... 14178820

(51) Int. Cl.
*G10L 19/26* (2013.01)
*G10L 19/025* (2013.01)
(Continued)

(52) U.S. Cl.
CPC ............ *G10L 19/26* (2013.01); *G10L 19/025* (2013.01); *G10L 19/0212* (2013.01); *G10L 21/02* (2013.01)

(58) Field of Classification Search
CPC ... G10L 19/26; G10L 19/025; G10L 19/0212; G10L 21/02; G01L 21/02
See application file for complete search history.

(56) References Cited

U.S. PATENT DOCUMENTS 5,012,517 A 4/1991 Wilson et al.
5,265,167 A 11/1993 Akamine et al.
(Continued)

FOREIGN PATENT DOCUMENTS

CN 1256000 A 6/2000
CN 1659626 A 8/2005
(Continued)

OTHER PUBLICATIONS

"Analysis-by-Synthesis Principles", IEEE Xplore, Wiley-IEEE EBooks; Jan. 1, 2001, Wiley-IEEE Press 2001, pp. 65-89 (Year: 2001), 2001, pp. 65-89.

(Continued)

*Primary Examiner* — Abul K Azad
(74) *Attorney, Agent, or Firm* — Perkins Coie LLP; Michael A. Glenn

(57) ABSTRACT

An apparatus for processing an audio signal having associated therewith a pitch lag information and a gain information, includes a domain converter for converting a first domain representation of the audio signal into a second domain representation of the audio signal; and a harmonic (Continued)

post-filter for filtering the second domain representation of the audio signal, wherein the post-filter is based on a transfer function including a numerator and a denominator, wherein the numerator includes a gain value indicated by the gain information, and wherein the denominator includes an integer part of a pitch lag indicated by the pitch lag information and a multi-tap filter depending on a fractional part of the pitch lag.

25 Claims, 8 Drawing Sheets

Related U.S. Application Data continuation of application No. 16/288,018, filed on Feb. 27, 2019, now Pat. No. 11,037,580, which is a continuation of application No. 15/417,231, filed on Jan. 27, 2017, now Pat. No. 10,242,688, which is a continuation of application No. PCT/EP2015/066998, filed on Jul. 24, 2015.

(51) Int. Cl.

| | |
|---|---|
| *G10L 19/02* | (2013.01) |
| *G10L 21/02* | (2013.01) |

(56) References Cited

U.S. PATENT DOCUMENTS

| | | | | |
|---|---|---|---|---|
| 5,293,449 | A | 3/1994 | Tzeng | |
| 5,359,696 | A | 10/1994 | Gerson et al. | |
| 5,568,688 | A | 10/1996 | Andrews | |
| 5,752,222 | A | 5/1998 | Nishiguchi et al. | |
| 5,752,223 | A | 5/1998 | Aoyagi et al. | |
| 5,774,835 | A | 6/1998 | Ozawa | |
| 6,058,350 | A | 5/2000 | Ihara | |
| 6,058,360 | A | 5/2000 | Bergstroem | |
| 7,707,034 | B2 | 4/2010 | Sun et al. | |
| 8,738,385 | B2 | 5/2014 | Chen | |
| 10,083,706 | B2 | 9/2018 | Markovic et al. | |
| 10,242,688 | B2 * | 3/2019 | Ravelli | G10L 19/025 |
| 11,037,580 | B2 * | 6/2021 | Ravelli | G10L 19/025 |
| 11,694,704 | B2 * | 7/2023 | Ravelli | G10L 19/025 704/207 |
| 2005/0165603 | A1 | 7/2005 | Bessette et al. | |
| 2008/0285775 | A1 | 11/2008 | Christoph et al. | |
| 2008/0319740 | A1 | 12/2008 | Su et al. | |
| 2012/0101824 | A1 | 4/2012 | Chen | |
| 2013/0096912 | A1 | 4/2013 | Resch et al. | |
| 2013/0332151 | A1 | 12/2013 | Fuchs et al. | |
| 2015/0051905 | A1 | 2/2015 | Gao | |
| 2016/0225384 | A1 | 8/2016 | Resch et al. | |

FOREIGN PATENT DOCUMENTS

| | | | |
|---|---|---|---|
| CN | 101296529 | A | 10/2008 |
| EP | 698877 | A2 | 2/1996 |
| EP | 2757560 | A1 | 7/2014 |
| JP | H10214100 | A | 8/1998 |
| JP | 2004302257 | A | 10/2004 |
| JP | 2005528647 | A | 9/2005 |
| JP | 2010520505 | A | 6/2010 |
| JP | 2011272297 | A3 | 12/2011 |
| JP | 2013120225 | A | 6/2013 |
| JP | 2013533983 | A | 8/2013 |
| JP | 2014510301 | A | 4/2014 |
| RU | 2121173 | C1 | 10/1998 |
| WO | 9938156 | A1 | 7/1999 |
| WO | 2004097798 | A1 | 11/2004 |

OTHER PUBLICATIONS

"Backward-Adaptive Code Excited Linear Prediction", IEEE Xplore; Wiley IEEE EBooks, Jan. 1, 2001, Wiley-IEEE Press 2001 (Year: 2001), Jan. 1, 2001.

"EVS Codec Error Concealment of Lost Packets (3GPP TS 26.447 version 12.0.0 Release 12)", Universal Mobile Telecommunications System (UMTS), LTE, ETSI TS 126 447 V12.0.0, Oct. 2014, Oct. 2014, 1-82.

"Information technology—MPEG audio technologies—Part 3: Unified speech and audio coding", ISO/IEC JTC 1/SC 29, ISO/IEC FDIS 23003-3:2011(E), ISO/IEC JTC 1/SC 29/WG 11, Sep. 20, 2011, Sep. 20, 2011, 1-291.

"ITU-T G.718", Series G: Transmission Systems and Media, Digital Systems and Networks Digital Terminal Equipments—Coding of Voice and Audio Signals. Frame Error Robust Narrow-Band and Wideband Embedded Variable Bit-Rate Coding of Speech and Audio From 8-32 kbit/s, Jun. 2008, 00-249.

Chen, Juin-Hwey, et al., "Adpative Postfiltering for Quality Enhancement of Coded Speech", IEEE Transactions on Speech and Audio Processing, vol. 3, No. 1, 59-71.

Fuchs, Hendrik, "Improving MPEG Audio Coding by Backward Adaptive Linear Stereo Prediction", Presented at the 99th Convention AES an Audio Engineering Society PreprintNew York, i-28.

Li, Guo, et al., "An Improved 1.2 kb/s speech coder based on MELP", IEEE conferences Jan. 1, 2004, Proceedings 7th International Conference on Signal Processing 2004, Proceedings ICSP '04, 2004, pp. 590-593. (Year: 2004), pp. 590-593.

Mustapha, Azhar, et al., "An adaptive post-filtering technique based on a least square approach", 1999 IEEE Workshop on Speech Coding Proceedings. Model, Coders, and Error Criteria (Cat. No. 99EX351); pp. 156-158 (Year: 1999), pp. 156-158.

Ojanperae, Juha, et al., "Long Term Predictor for Transform Domain Perceptual Audio Coding", Presented at the 107th Convention AES an Audio Engineering Society PreprintNew York, i-25.

Song, Jeongook, et al., "Harmonic Enhancement in Low Bitrate Audio Coding Using an Efficient Long-Term Predictor", Hindawi Publishing Corporation Eurasip Journal on Advances in Signal Processing vol. 2010, Article ID 939542doi: 10.1155/2010/939542, 1-9.

Yin, Lin, et al., "A New Backward Predictor for MPEG Audio Coding", Presented at the 103rd Convention AES an Audio Engineering Society PreprintNew York, i-12.

* cited by examiner $$H(z) = \frac{1 - \alpha\beta g B(z,0)}{1 - \beta g B(z,T_{fr}) z^{-T_{int}}}$$

$g$ : gain value $T_{fr}$ : fractional part of pitch lag $T_{int}$ : integer part of pitch lag $B(z, T_{fr})$ : multi-tap FIR filter depending on fractional part $B(z, 0)$ : multi-tap FIR filter for a zero fractional part $\alpha$ : first scalar value $0.6 \leq \alpha < 1.0$ $\beta$ : second scalar value $0.1 \leq \beta \leq 0.5$

FIG 3

$g=1; \alpha=0.8; T_{fr}=1/4; T_{int}=60$

APPARATUS AND METHOD FOR PROCESSING AN AUDIO SIGNAL USING A HARMONIC POST-FILTER

CROSS-REFERENCE TO RELATED APPLICATIONS

This application is a continuation of copending U.S. patent application Ser. No. 17/144,979 filed Jan. 8, 2021, which is a continuation of U.S. patent application Ser. No. 16/288,018, filed Feb. 27, 2019, which in turn is a continuation of copending U.S. patent application Ser. No. 15/417,231, filed Jan. 27, 2017, which in turn is a continuation of copending International Application No. PCT/EP2015/066998, filed Jul. 24, 2015, all of which are incorporated herein by reference in their entirety, and additionally claims priority from European Application No. 14178820.8, filed Jul. 28, 2014, which is incorporated herein by reference in its entirety.

The present invention is related to audio processing and, particularly, to audio processing using a harmonic post filter.

BACKGROUND OF THE INVENTION

Transform-based audio codecs generally introduce inter-harmonic noise when processing harmonic audio signals, particularly at low bitrates.

This effect is further worsen when the transform-based audio codec operates at low delay, due to the worse frequency resolution and/or selectivity introduced by a shorter transform size and/or a worse window frequency response.

This inter-harmonic noise is generally perceived as a very annoying artifact, significantly reducing the performance of the transform-based audio codec when subjectively evaluated on highly tonal audio material.

Several solutions exist to improve the subjective quality of transform-based audio codecs on harmonics audio signals. All of them are based on prediction-based techniques, either in the transform-domain or in the time-domain.

Examples of Transform-Domain Approaches are:

[1] H. Fuchs, "Improving MPEG Audio Coding by Backward Adaptive Linear Stereo Prediction", 99th AES Convention, New York 1995, Preprint 4086.

[2] L. Yin, M. Suonio, M. Väänänen, "A New Backward Predictor for MPEG Audio Coding", 103rd AES Convention, New York 1997, Preprint 4521

[3] Juha Ojanperá, Mauri Väänänen, Lin Yin, "Long Term Predictor for Transform Domain Perceptual Audio Coding", 107th AES Convention, New York 1999, Preprint 5036.

Examples of Time-Domain Approaches are:

[4] Philip J. Wilson, Harprit Chhatwal, "Adaptive transform coder having long term predictor", U.S. Pat. No. 5,012,517, Apr. 30, 1991.

[5] Jeongook Song, Chang-Neon Lee, Hyen-O Oh, Hong-Goo Kang, "Harmonic Enhancement in Low Bitrate Audio Coding Using and Efficient Long-Term Predictor", EURASIP Journal on Advances in Signal Processing 2010.

[6] Juin-Hwey Chen, "Pitch-based pre-filtering and post-filtering for compression of audio signals", U.S. Pat. No. 8,738,385, May 27, 2014.

SUMMARY

An embodiment may have an apparatus for processing an audio signal having associated therewith a pitch lag information and a gain information, including: a domain converter for converting a first domain representation of the audio signal into a second domain representation of the audio signal, the second domain representation being a time domain representation; and a harmonic post-filter for filtering the second domain representation of the audio signal, wherein the harmonic post-filter is based on a long-term prediction filter working in the time-domain.

Another embodiment may have a method of processing an audio signal having associated therewith a pitch lag information and a gain information, including: converting a frequency representation of the audio signal into a time-domain representation of the audio signal; and filtering the time-domain representation of the audio signal by a harmonic post-filter, wherein the harmonic post-filter is based on a long-term prediction filter working in the time-domain.

Another embodiment may have a system for processing an audio signal including an encoder for encoding an audio signal and a decoder including a processor, the processor including: a domain converter for converting a frequency representation of the audio signal into a time-domain representation of the audio signal; and a harmonic post-filter for filtering the time-domain representation of the audio signal, wherein the harmonic post-filter is based on a long-term prediction filter working in the time-domain.

Another embodiment may have a method of processing an audio signal including a method of encoding an audio signal and a method of decoding including: converting a frequency representation of the audio signal into a time-domain representation of the audio signal; and filtering the time-domain representation of the audio signal using a harmonic post-filter, wherein the harmonic post-filter is based on a long-term prediction filter working in the time-domain.

Another embodiment may have a non-transitory digital storage medium having a computer program stored thereon to perform the method of processing an audio signal having associated therewith a pitch lag information and a gain information, including: converting a frequency representation of the audio signal into a time-domain representation of the audio signal; and filtering the time-domain representation of the audio signal by a harmonic post-filter, wherein the harmonic post-filter is based on a long-term prediction filter working in the time-domain; when said computer program is run by a computer.

Another embodiment may have a non-transitory digital storage medium having a computer program stored thereon to perform the method of processing an audio signal comprising a method of encoding an audio signal and a method of decoding including: converting a frequency representation of the audio signal into a time-domain representation of the audio signal; and filtering the time-domain representation of the audio signal using a harmonic post-filter, wherein the harmonic post-filter is based on a long-term prediction filter working in the time-domain; when said computer program is run by a computer.

The present invention is based on the finding that the subjective quality of an audio signal can be substantially improved by using a harmonic post-filter having a transfer function comprising a numerator and a denominator. The numerator of the transfer function comprises a gain value indicated by a transmitted gain information and the denominator comprises an integer part of a pitch lag indicated by a pitch lag information and a multi-tap filter depending on a fractional part of the pitch lag.

Hence, it is possible to remove inter-harmonic noise introduced by a typical domain-changing audio decoder as an artifact. This harmonic post-filter is particularly useful in that it relies on transmitted information, i.e., the pitch gain and the pitch lag which are available anyway in a decoder, since this information is received from a corresponding encoder via a decoder input signal. Furthermore, the post-filtering is of specific accuracy due to the fact that not only the integer part of the pitch lag is accounted for, but, in addition, the fractional part of the pitch lag is accounted for. The fractional part of the pitch lag can be particularly introduced into the post-filter via a multi-tap filter which has filter coefficients actually depending on the fractional part of the pitch lag. This filter can be implemented as an FIR filter or can also be implemented as any other filter such as an IIR filter or a different filter implementation. Any domain change such as a time to frequency change or an LPC to time change or a time to LPC change or a frequency to time change can be advantageously improved by the post-filter concept of the invention. Advantageously, however, the domain change is a frequency to time domain change.

Hence, embodiments of the present invention reduces inter-harmonic noise introduced by a transform audio codec based on a long-term predictor working in the time domain. Contrary to [04]-[6], where both pre-filter before the transform coding and a post-filter after the transform decoding are used, the present invention may apply a post-filter only.

Furthermore, it has been noticed that the pre-filter employed in [04]-[6] has the tendency to introduce instabilities in the input signal given to the transform encoder. These instabilities are due to changes in gain and/or pitch lag from frame to frame. The transform coder has difficulties in encoding such instabilities, particularly at low bitrates, and one will sometimes introduce even more noise in the decoded signal compared to a situation without any pre- or post-filter.

Advantageously, the present invention does not employ any pre-filter at all and, therefore, completely avoids the problems involved with a pre-filter.

Furthermore, the present invention relies on a post-filter that is applied on the decoded signal after transform coding. This post-filter is based on a long-term prediction filter accounting for the integer part and the fractional part of the pitch lag that reduces the inter-harmonic noise introduced by the transform audio codec.

For better robustness, the post-filter parameters pitch lag and pitch gain are estimated at the encoder-side and transmitted in the bitstream. However, in other implementations, the pitch lag and pitch gain can also be estimated on the decoder-side based on the decoded audio signal obtained by an audio decoder comprising a frequency-time converter for converting a frequency-representation of the audio signal into a time-domain representation of the audio signal.

In an embodiment, the numerator additionally comprises a multi-tap filter for a zero fractional part of the pitch lag in order to compensate for a spectral tilt introduced by the multi-tap filter in the denominator, which depends on the fractional part of the pitch lag.

Advantageously, the post-filter is configured to suppress an amount of energy between harmonics in a frame, wherein the amount of energy suppressed is smaller than 20% of a total energy of the time-domain representation in the frame.

In a further embodiment, the denominator comprises a product between the multi-tap filter and the gain value.

In a further embodiment, the filter numerator further comprises a product of a first scalar value and a second scalar value, wherein the denominator only comprises the second scalar value rather than the first scalar value. These scalar values are set to predetermined values and have values greater than 0 and lower than 1; and, additionally, the second scalar value is lower than the first scalar value. Hence, it is possible in a very efficient way to set the energy removal characteristics which are typically unwanted and to additionally set the filter strength, i.e., how strong the filter attenuates inter-harmonic artifacts in a transform-domain decoder output signal.

The apparatus further comprises, in an embodiment, a filter controller for setting at least the second scalar value depending on a bitrate so that a higher value is set for a lower bitrate and vice versa.

Furthermore, the filter controller is configured for selecting, depending on the fractional part of the pitch lag, the corresponding multi-tap filter in a signal-dependent way in order to set the harmonic post-filter signal-adaptively, i.e., dependent on the actually provided fractional part value of the pitch lag.

BRIEF DESCRIPTION OF THE DRAWINGS

Embodiments of the present invention will be detailed subsequently referring to the appended drawings, in which:

FIG. 3 illustrates a further embodiment for the harmonic post-filter represented by a transfer function in the z domain;

DETAILED DESCRIPTION OF THE INVENTION

Figure 1:
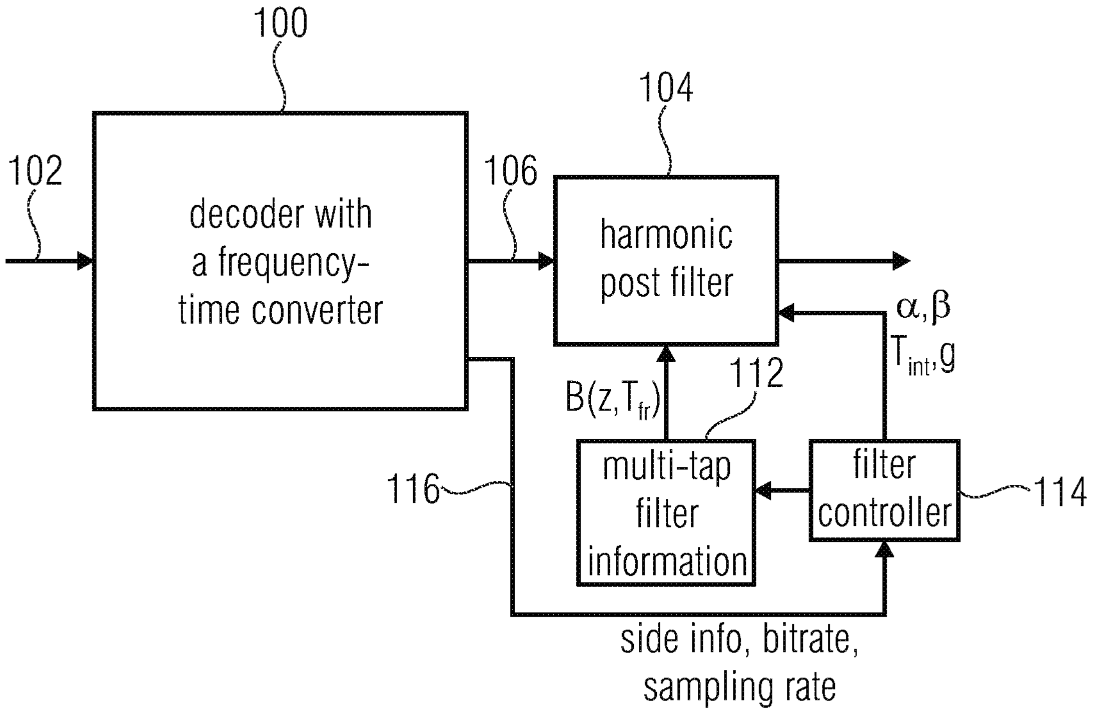
FIG. 1 illustrates an embodiment of an inventive apparatus for processing an audio signal.

FIG. 1 illustrates an apparatus for processing an audio signal having associated therewith a pitch lag information and a gain information. This gain information can be transmitted to a decoder 100 via a decoder input 102 receiving an encoded signal or, alternatively, this information can be calculated in the decoder itself, when this information is not available. However, for a more robust operation, it is advantageous to calculate the pitch lag information and the pitch gain information on the encoder-side.

The decoder 100 comprises e.g. a frequency-time converter for converting a frequency-time representation of the audio signal into a time-domain representation of the audio signal. Thus, the decoder is not a pure time-domain speech codec, but comprises a pure transform domain decoder or a mixed transform domain decoder or any other coder operating in a domain different from a time domain. Furthermore, it is advantageous that the second domain is the time domain.

The apparatus furthermore comprises a harmonic post-filter 104 for filtering the time-domain representation of the audio signal, and this harmonic post-filter is based on a transfer function comprising a numerator and a denominator. Particularly, the numerator comprises a gain value indicated by the gain information and the denominator comprises an integer part of a pitch lag indicated by the pitch lag information and, importantly, further comprises a multi-tap filter depending on a fractional part of the pitch lag.

Figure 2:
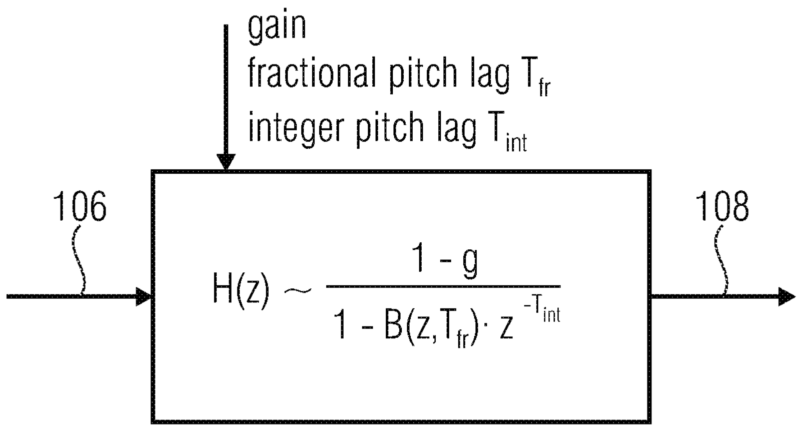
FIG. 2 illustrates an implementation of the harmonic post-filter represented as transfer functions in the z domain.

An implementation of this harmonic post filter with a transfer function H(z) is illustrated in FIG. 2. This filter receives the decoder output signal 106 and subjects this decoded output signal to a post-filtering operation to obtain a post-filtered output signal 108. This post-filtered output signal can be output as the processed signal or can be further processed by any procedure for removing any discontinuities introduced by the post-filtering operation which, of course, is signal-dependent, i.e., can vary from frame to frame. This discontinuity removal operation can be any of the well-known discontinuity removal operation such as cross-fading, which means that an earlier frame is faded out and, at the same time, a new frame is faded in and, advantageously, the fading characteristic is so that the fading factors add up to one throughout the cross-fading operation. However, other discontinuity removal such as low-pass filtering or LPC filtering can be applied as well.

The apparatus for processing an audio signal illustrated in FIG. 1 furthermore comprises a multi-tap filter information storage 112 and a filter controller 114. Particularly, the filter controller 114 receives side information 116 from the decoder 100, and this side information can, for example, be the pitch gain information g and the pitch lag information, i.e., information on the integer part $T_{int}$ of the pitch lag and the fractional part $T_{fr}$ of the pitch lag. This information is useful for setting the harmonic post-filter from frame to frame and, additionally, for selecting a multi-tap filter information $B(z,T_{fr})$. Furthermore, additional information such as the bitrate applied by the decoder or the sampling rate underlying the decoded signal can also be used by the filter control 114 in order to particularly set the scalar values α, β for a certain encoder and/or decoder setting with respect to bitrate and sampling rate.

FIG. 2 illustrates a pole/zero representation of a filter transfer function H(z) in the z domain as known in the art. Naturally, there are numerous other representations of the harmonic post-filter, which are all filter representations, which can be converted to the kind of pole/zero representation in the z domain. Hence, the present invention is applicable for each filter which is describable in any way by such a transfer function as illustrated in the specification.

FIG. 3 illustrates an embodiment of the harmonic post-filter again described a as a transfer function in the pole/zero notation in the z domain.

The filter can be described as follows:

$$H(z) = \frac{1 - \alpha\beta g B(z, 0)}{1 - \beta g B(z, T_{fr}) z^{T_{int}}}$$

with g the decoded gain, $T_{int}$ and $T_{fr}$ the integer and fractional part of the decoded pitch lag, α and β two scalars that weight the gain, and $B(z,T_{fr})$ a low-pass FIR filter whose coefficients depends on the fractional part of the decoded pitch lag.

Note that B(z,0) in the numerator of H(z) is used to compensate for the tilt introduced by $B(z,T_{fr})$.

β is used to control the strength of the post-filter. A β equals to 1 produces full effects, suppressing the maximum possible amount of energy between the harmonics. A β equals to 0 disables the post-filter. Generally, a quite low value is used to not suppress too much energy between the harmonics. The value can also depend on the bitrate with a higher value at a lower bitrate, e.g. 0.4 at low bitrate and 0.2 at a high bitrate.

α is used to add a slight tilt to the frequency response of H(z), in order to compensate for the slight loss in energy in the low frequencies. The value of α is generally chosen close to 1, e.g. 0.8.

Figure 6:
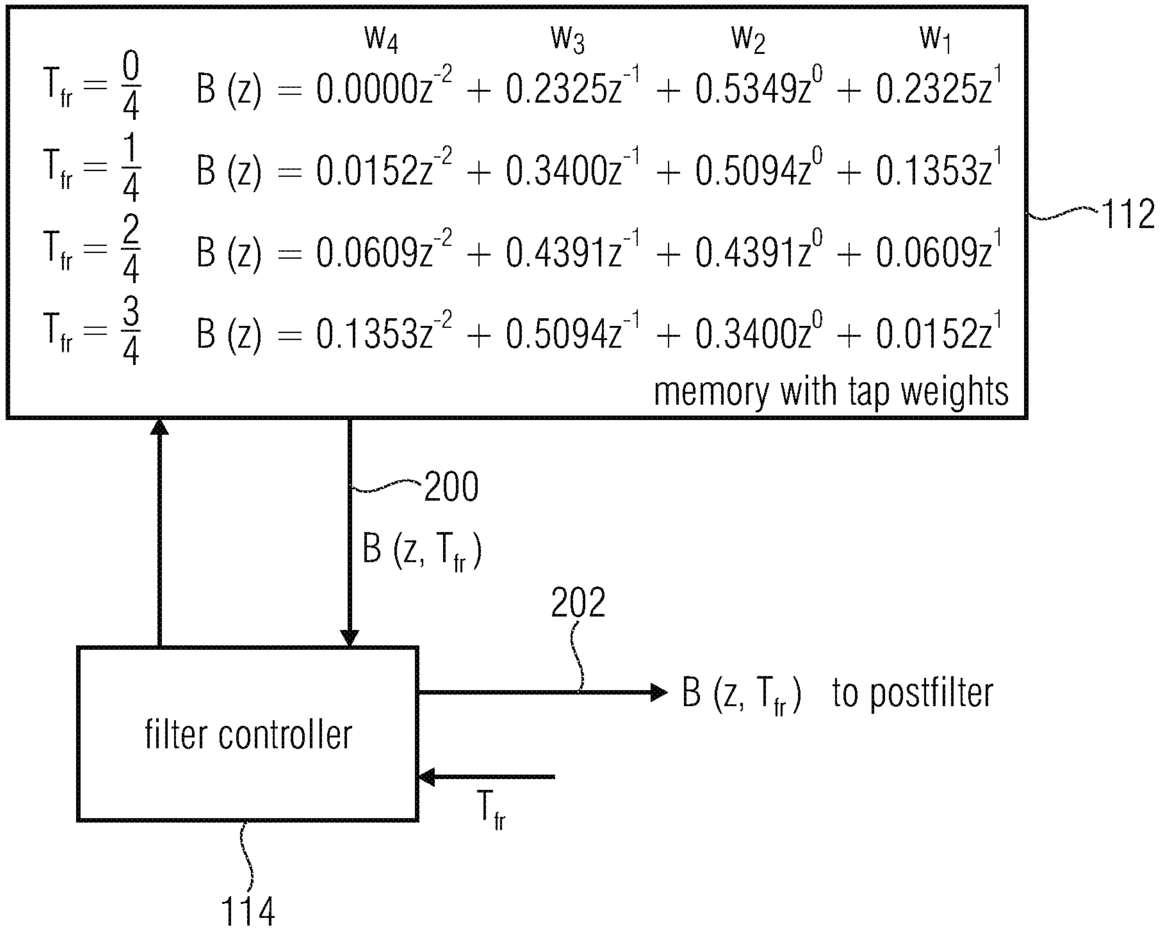
FIG. 6 illustrates a cooperation between the filter controller and a memory having pre-stored tap weights depending on the fractional part.

An example of $B(z,T_{fr})$ is given in FIG. 6. The order and the coefficients of $B(z,T_{fr})$ can also depend on the bitrate and the output sampling rate. A different frequency response can be designed and tuned for each combination of bitrate and output sampling rate.

Particularly, it has been found out that even values for α between 0.6 and lower than 1.0 are useful and that, additionally, values for β between 0.1 and 0.5 have been proved to be useful as well.

Furthermore, the multi-tap filter can have a variable number of taps. It has been found that for certain implementations, four taps are sufficient, where one tap is $z^{+1}$. However, smaller filters with only two taps or even larger filters with more than four taps are useful for certain implementations.

FIG. 6 illustrates an implementation of filters B(z) for different fractional values of the pitch lag and, particularly, for a pitch lag resolution of ¼. For this implementation, four different filter descriptions for the multi-tap filter in the denominator of the transfer function of the harmonic post-filter are illustrated. However, it has been found that the filter coefficients do not necessarily have to indicate exactly the illustrated values in FIG. 6, but certain variations of +/−0.05 can be useful in other implementations as well.

Figure 5:
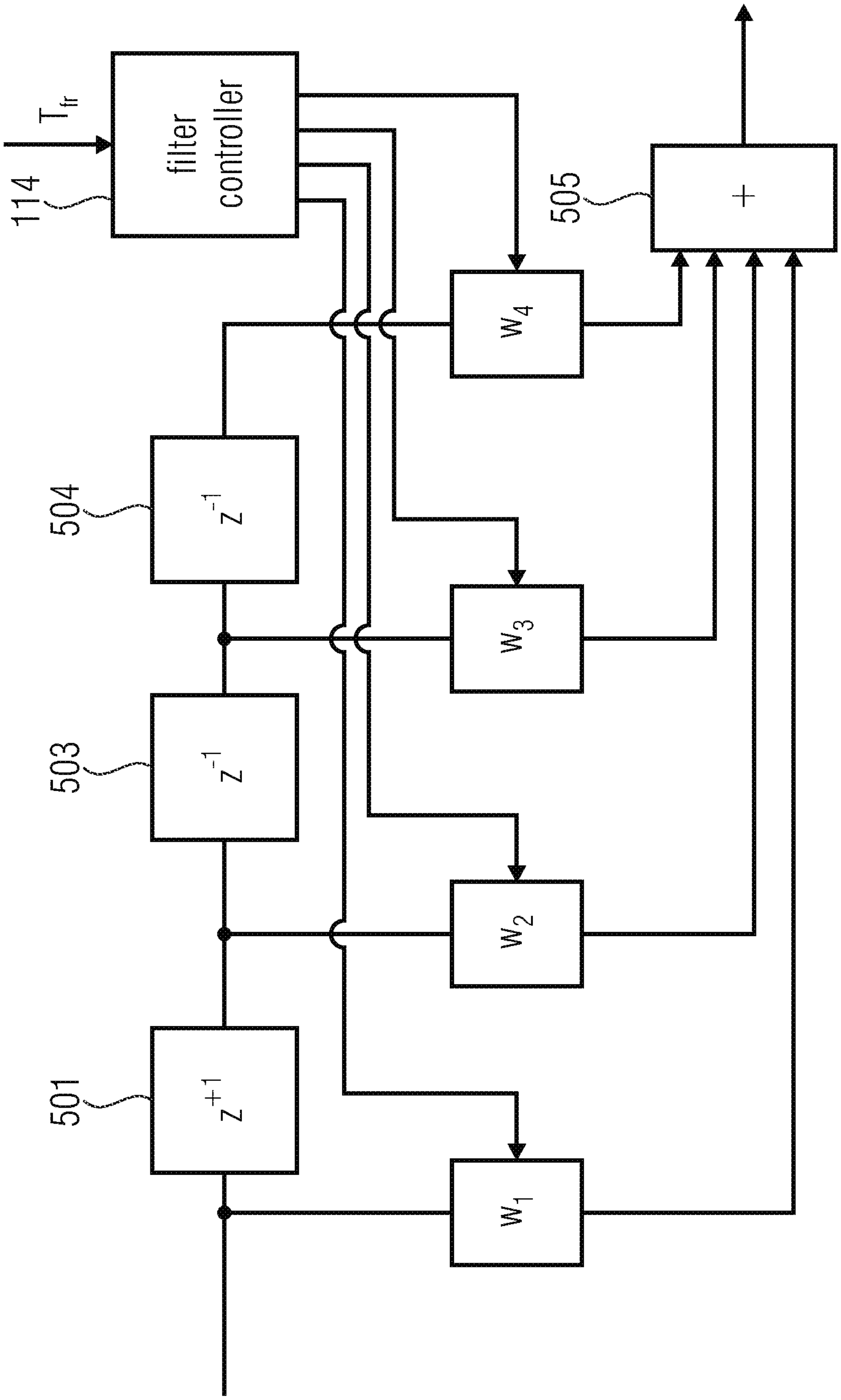
FIG. 5 illustrates an implementation of the multi-tap filter as an FIR filter controlled by a filter controller.

Particularly, as illustrated in FIG. 1, the tap weights illustrated in FIG. 6 are stored within the memory 112 for the multi-tap filter information. The filter controller 114 receives the fractional part $T_{fr}$ from line 116 of FIG. 1 and, in response to this value, addresses the memory 112 in order to retrieve, via a retrieval line 200 the specific filter information for the specific fractional part of the pitch lag. This information is then forwarded via an output line 202 to the harmonic post-filter 104 so that the harmonic post-filter is correctly set. A certain implementation of the multi-tap FIR filter is illustrated in FIG. 5. The weight indication $w_1$ to $w_4$ corresponds to the notation in FIG. 6 and the filter controller 114 applies, in response to the actual fractional part of the pitch lag the corresponding weights for a certain audio frame. The other portions such as delay portions 501, 502, 503 and the combiner 505 can be implemented as illustrated. In this context, it is emphasized that the delay value 501 is, in the z notation a negative delay value, since it has been found out that an FIR filter representation having a negative delay value in addition to a positive delay value such as 503 and 504 is particularly useful.

Figure 4:
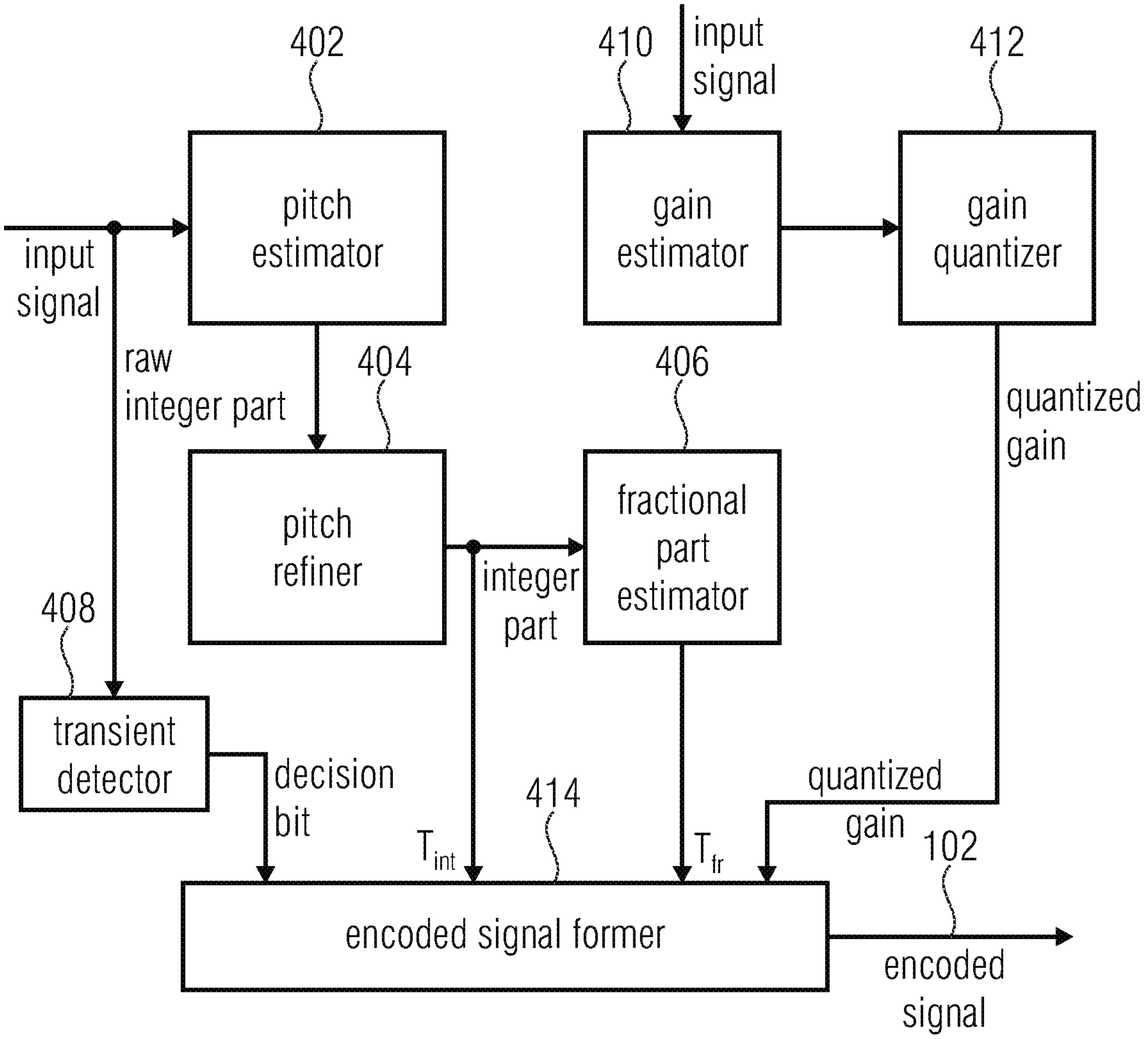
FIG. 4 illustrates an implementation of an encoder for generating an encoded signal to be decoded by a transform-domain audio decoder illustrated in FIG. 1.

Subsequently, an encoder implementation having certain functional blocks and operating without any pre-filter is illustrated in FIG. 4. The filter portion illustrated in FIG. 4 comprises a pitch estimator 402, a pitch refiner 404, a fractional part estimator 406, a transient detector 408, a gain estimator 410 and a gain quantizer 412. The information provided by the gain quantizer 412, the fractional part estimator 406, the pitch refiner 404 and the decision bit generated by the transient detector 408 are input into an encoded signal former 414. The encoded signal former provides an encoded signal 102, which is then input into the decoder 100 illustrated in FIG. 1. The encoded signal 102 will comprise additional signal information not illustrated in FIG. 4.

Subsequently, the functionality of the pitch estimator 402 is described.

One pitch lag (integer part+fractional part) per frame is estimated (frame size e.g. 20 ms). This is done in 3 steps to reduce complexity and improves estimation accuracy.

A pitch analysis algorithm that produces a smooth pitch evolution contour is used (e.g. Open-loop pitch analysis described in Rec. ITU-T G.718, sec. 6.6). This analysis is generally done on a subframe basis (subframe size e.g. 10 ms), and produces one pitch lag estimate per subframe. Note that these pitch lag estimates do not have any fractional part and are generally estimated on a downsampled signal (sampling rate e.g. 6400 Hz). The signal used can be any audio signal, e.g. a LPC weighted audio signal as described in Rec. ITU-T G.718, sec. 6.5.

The pitch refiner operates as follows:

The final integer part of the pitch lag is estimated on an audio signal x[n] running at the core encoder sampling rate, which is generally higher than the sampling rate of the downsampled signal used in a. (e.g. 12.8 kHz, 16 kHz, 32 kHz . . . ). The signal x[n] can be any audio signal e.g. an LPC weighted audio signal.

The integer part of the pitch lag is then the lag $d_m$ that maximizes the autocorrelation function $$C(d) = \sum_{n=0}^{N} x[n]x[n-d]$$

with d around a pitch lag T estimated in step 1.a.

$$T-\delta_1 \le d \le T+\delta_2$$

The fractional part estimator 406 operates as follows:

The fractional part is found by interpolating the autocorrelation function C(d) computed in step 2. b. and selecting the fractional pitch lag which maximizes the interpolated autocorrelation function. The interpolation can be performed using a low-pass FIR filter as described in e.g. Rec. ITU-T G.718, sec. 6.6.7.

The transient detector 408 illustrated in FIG. 4 is configured for generating a decision bit.

If the input audio signal does not contain any harmonic content, then no parameters are encoded in the bitstream. Only 1 bit is sent such that the decoder knows whether he has to decode the post-filter parameters or not. The decision is made based on several parameters:

a. Normalized correlation at the integer pitch lag estimated in step 1.b.

$$norm.\text{corr.} = \frac{\sum_{n=0}^{N} x[n]x[n-d_m]}{\sqrt{\sum_{n=0}^{N} x[n]x[n]}\sqrt{\sum_{n=0}^{N} x[n-d_m]x[n-d_m]}}$$

The normalized correlation is 1 if the input signal is perfectly predictable by the integer pitch lag, and 0 if it is not predictable at all. A high value (close to 1) would then indicate a harmonic signal. For a more robust decision, the normalized correlation of the past frame can also be used in the decision, e.g.:

If (norm.corr(curr.)*norm.corr.(prev.))>0.25, then the current frame contains some harmonic content (bit=1)

b. Features computed by a transient detector (e.g. Temporal flatness measure, Maximal energy change), to avoid activating the post-filter on a signal containing a transient. e.g. If (tempFlatness>3.5 or maxEnergychange>3.5) then set bit=0 and do not send any parameters Furthermore, the gain estimator 410 calculates a gain to be input into the gain quantizer 412

The gain is generally estimated on the input audio signal at the core encoder sampling rate, but it can also be any audio signal like the LPC weighted audio signal. This signal is noted y[n] and can be the same or different than x[n].

The prediction $y_P[n]$ of y[n] is first found by filtering y[n] with the following filter $$P(z)=B(z,T_{fr})z^{-T_{int}}$$

with $T_{int}$ the integer part of the pitch lag (estimated in 1.b.) and $B(z,T_{fr})$ a low-pass FIR filter whose coefficients depend on the fractional part of the pitch lag $T_{fr}$ (estimated in 1.c.).

One example of B(z) when the pitch lag resolution is ¼:

$$T_{fr}=0/4\ B(z)=0.0000z^{-2}+0.2325z^{-1}+0.5349z^{0}+0.2325z^{1}$$

$$T_{fr}=1/4\ B(z)=0.0152z^{-2}+0.3400z^{-1}+0.5049z^{0}+0.1353z^{1}$$

$$T_{fr}=2/4\ B(z)=0.0609z^{-2}+0.4391z^{-1}+0.4391z^{0}+0.0609z^{1}$$

$$T_{fr}=3/4\ B(z)=0.1353z^{-2}+0.5094z^{-1}+0.3400z^{0}+0.0152z^{1}$$

The gain g is then computed as follows:

$$g = \frac{\sum_{n=0}^{N-1} y[n]y_P[n]}{\sum_{n=0}^{N-1} y_P[n]y_P[n]}$$

and limited between 0 and 1.

Finally, the gain is quantized e.g. on 2 bits, using e.g. uniform quantization. If the gain is quantized to 0, then no parameters are encoded in the bitstream, only the one decision bit (bit=0).

As outlined before, the post-filter is applied on the output audio signal after the transform decoder. It processes the signal on the frame-by-frame basis, with the same frame size as used it the encoder-side such as 20 ms. As illustrated, it is based on a long-term prediction filter H(z) whose parameters are determined from the parameters estimated at the encoder-side and decoded from the bitstream. This information comprises the decision bit, the pitch lag and the gain. If the decision bit is 0, then the pitch lag and the gain are not decoded and are assumed to be 0 not written at all into the bitstream.

As discussed, if the filter parameters are different from one frame to the next frame, a discontinuity can be introduced at the border between the two frames. To avoid discontinuity, a discontinuity remover is applied such as a cross-fader or any other implementation for that purpose.

Furthermore, several different ways to set the harmonic post-filter are illustrated in FIGS. 7*a* to 8*b*. The plots illustrate the frequency domain transfer function. The horizontal axis is related to the normalized frequency 1 and the vertical axis is the magnitude of the filter response in dB. It is emphasized that in all illustrations but FIG. 7*b*, the filter introduces an amplification for low frequencies, i.e., a certain positive dB magnitude value.

Figure 7A:
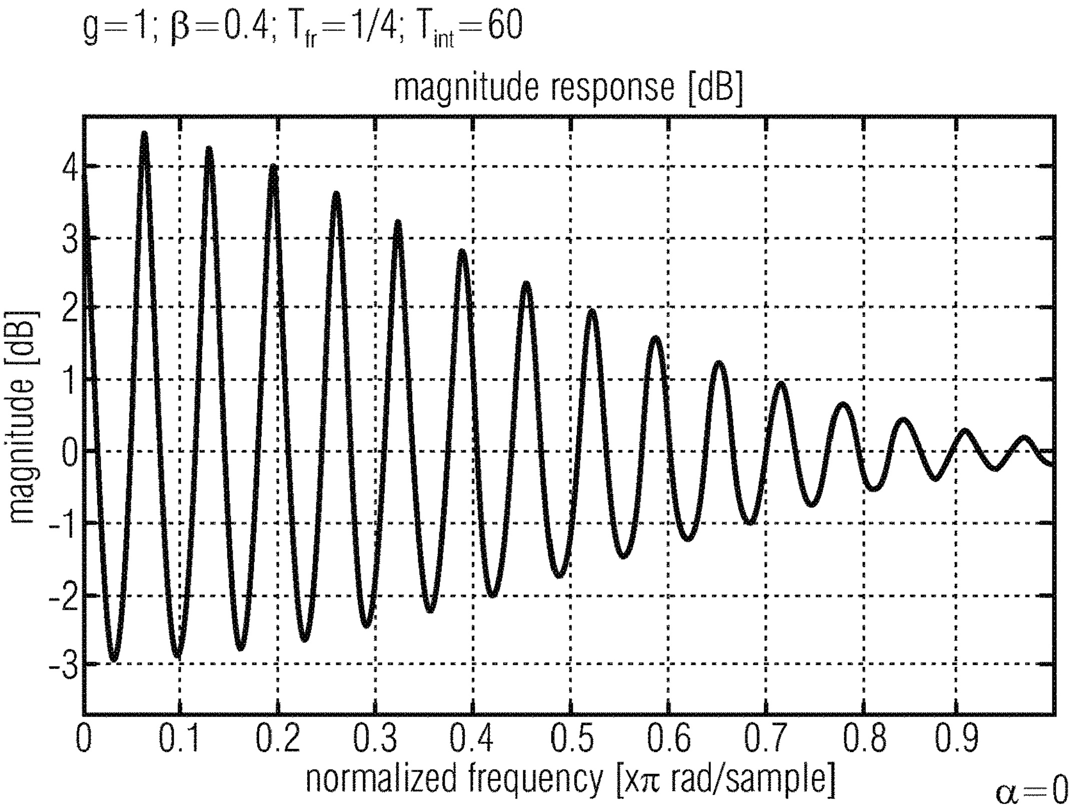
FIG. 7*a* illustrates a frequency response of a filter having a zero $\alpha$ value.
Figure 7B:
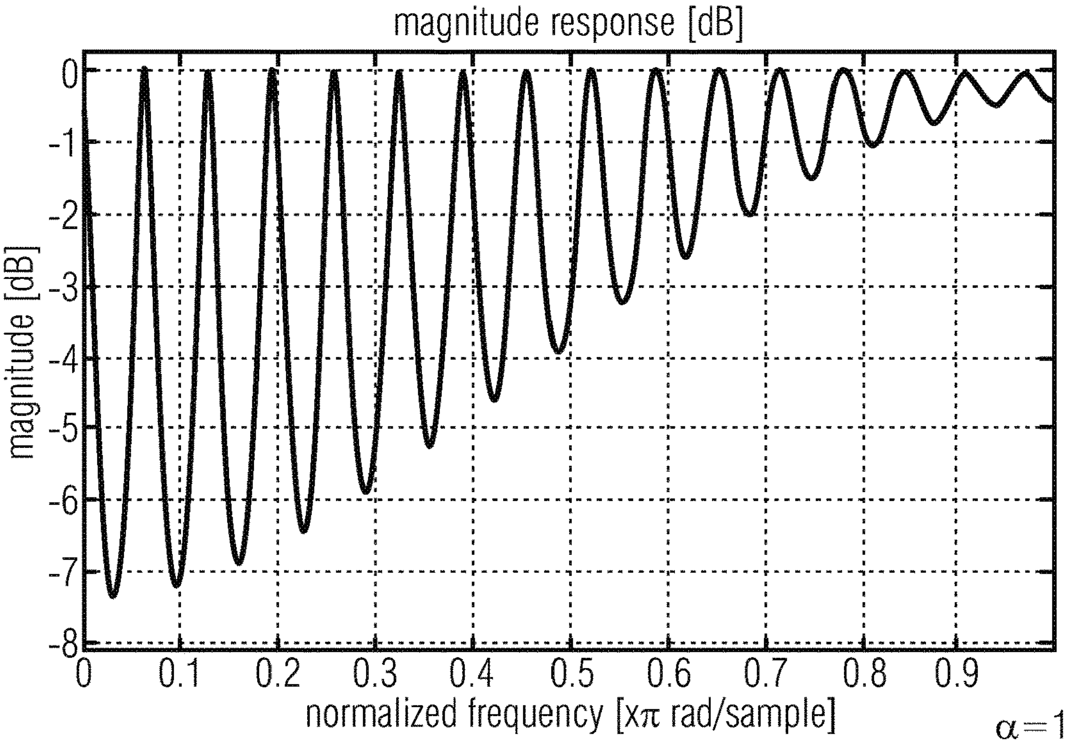
FIG. 7*b* illustrates a frequency response of a harmonic post-filter having an $\alpha$ value equal to 1.

Particularly, FIG. 7*a* illustrates a transfer function, implementing the filter in FIG. 3, with the certain parameter values as indicated above. Furthermore, the α value, i.e., the first scalar value is set to 0. FIG. 7*b* illustrates a similar situation, but now with an α value equal to 1. The other parameters are identical to FIG. 7*a*.

Figure 7C:
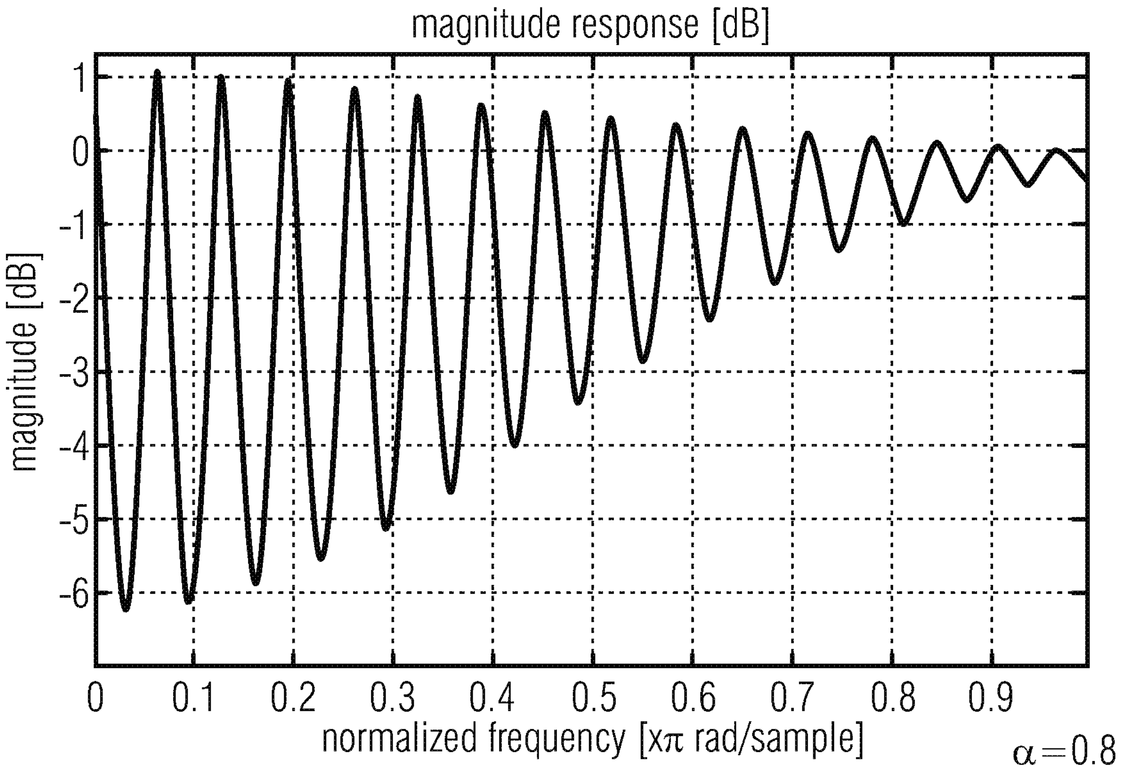
FIG. 7*c* illustrates a frequency response of a harmonic post-filter having an $\alpha$ value of 0.8.

FIG. 7*c* illustrates a further implementation where α is equal to 0.8 which has a slight tilt and a boosting of the lower frequencies. Again, FIG. 7 has the same other parameters as indicated in FIG. 7*a*. It becomes clear that α equal to 1 removes the tilt and all harmonic frequencies have a gain of 1. The drawback of this setting is a loss of energy at the frequencies between the harmonics. Therefore, a value of α equal to 0.8 as in FIG. 7*c* is advantageous. This value adds a slight tilt compared to the α equal to 1 situation of FIG. 7*b*. In order to compensate the loss of energies at the frequencies between the harmonics, this slight tilt may be used.

Figure 8A:
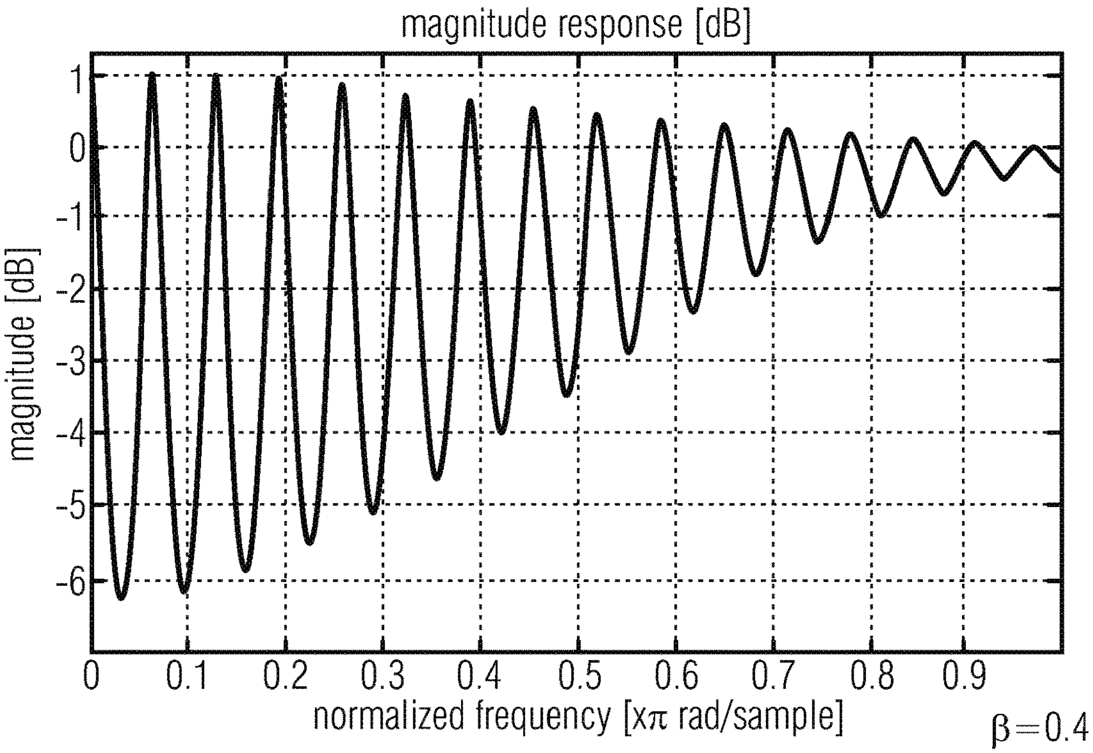
FIG. 8*a* illustrates an embodiment of a harmonic post-filter having a $\beta$ value equal to 0.4.
Figure 8B:
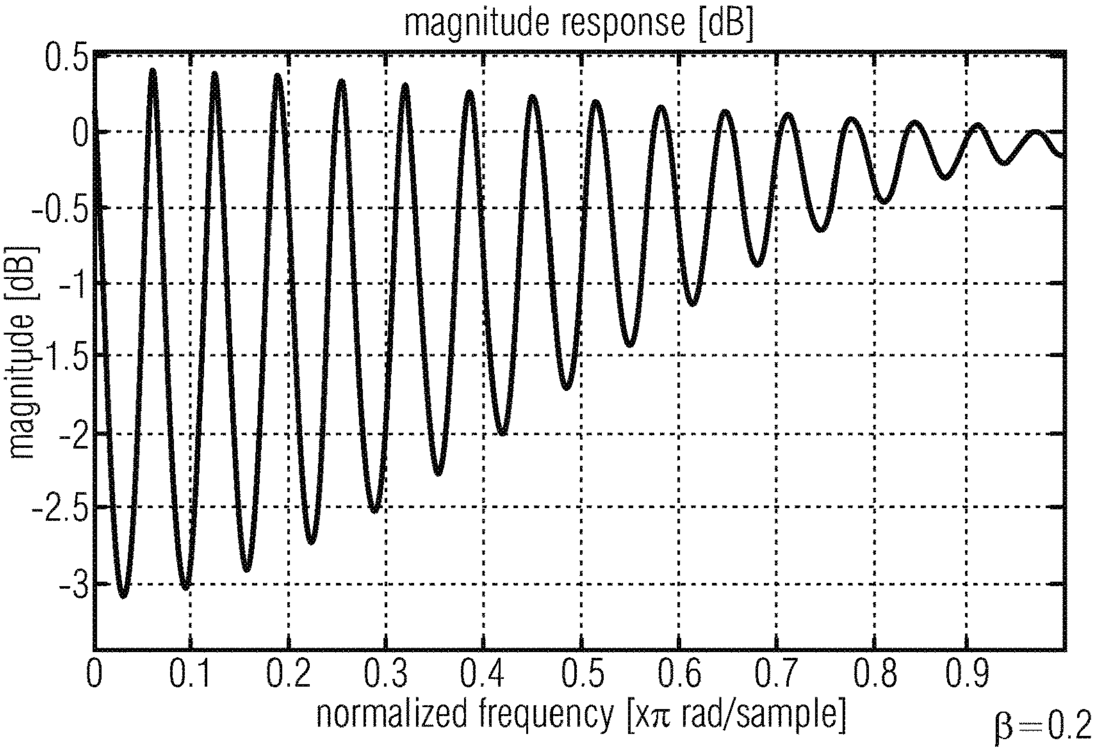
FIG. 8*b* illustrates a frequency response of a harmonic post-filter having a $\beta$ value of 0.2.

Furthermore, FIGS. 8*a* and 8*b* illustrate filter settings for a value of α equal to 0.8 and different β-values, i.e., a β-value of 0.4 in FIG. 8*a* and a β-value of 0.2 in FIG. 8*b*. It becomes clear that a β-value of 0.4 has a stronger post-filtering effect compared to a β-value of 0.2 and, therefore, a β-value of 0.4 is used at lower bitrates in order to remove inter-harmonic noise introduced by such a low bitrate.

On the other hand, β equal 0.2 has a less strong effect for suppressing energy between the harmonics and, therefore, this β-value is advantageous for high bitrates due to the fact that at such higher bitrates, not so much inter-harmonic noise exists.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for processing an audio signal, comprising:

a domain converter for converting a first domain representation of the audio signal into a second domain representation of the audio signal, wherein the audio signal being an input signal into the apparatus for processing has associated therewith a pitch lag information and a gain information, wherein the pitch lag information indicates a pitch lag having an integer part and a fractional part; and a harmonic post-filter for filtering the second domain representation of the audio signal, wherein the harmonic post-filter is configured to account for the integer part of the pitch lag indicated by the pitch lag information associated with the audio signal and the fractional part of the pitch lag indicated by the pitch lag information associated with the audio signal.

2. Apparatus of claim 1, wherein the second domain representation is a time domain representation.

3. Apparatus of claim 1, wherein the long-term prediction filter, on which the harmonic post-filter is based, comprises filter parameters comprising the pitch lag, wherein the filter parameters comprising the pitch lag are determined from parameters decoded from a bitstream comprising the audio signal and the pitch lag information and the gain information.

4. Apparatus of claim 3, wherein the bitstream further comprises a decision bit, and wherein the apparatus is configured to not decode any pitch lag or gain, or to assume the pitch lag and the gain as not written into the bitstream, or to assume the pitch lag and the gain as a zero value, when the decision bit is equal to zero.

5. Apparatus of claim 1, wherein the harmonic post-filter comprises filter parameters, the filter parameters being the pitch lag and a gain derived from the pitch lag information and the gain information, respectively, wherein the harmonic post-filter is configured to have different parameters from a frame to a next frame, and wherein the apparatus further comprises a discontinuity remover for reducing a discontinuity at a border between the frame and the next frame.

6. Apparatus of claim 5, wherein the discontinuity remover comprises at least one of a cross-fader, a low-pass filter, or an LPC filter.

7. Apparatus of claim 5, wherein the discontinuity remover is configured to fade out a post filtered audio signal of the frame and, at the same time, to fade in a post filtered audio signal of the next frame.

8. Apparatus of claim 7, wherein a cross-fading characteristic of the fading out and the fading in is so that fading factors add up to one throughout a cross-fading operation.

9. The apparatus of claim 1, wherein the long-term prediction filter, on which the harmonic post-filter is based, is based on a transfer function comprising a numerator and a denominator, wherein the numerator comprises a multi-tap FIR filter for the fractional part of the pitch lag having a value of zero.

10. The apparatus of claim 1, wherein the long-term prediction filter, on which the harmonic post-filter is based, is based on a transfer function comprising a numerator and a denominator, wherein the denominator comprises a product between a multi-tap filter and a gain value comprised by the gain information associated with the audio signal.

11. The apparatus of claim 1, wherein the long-term prediction filter, on which the harmonic post-filter is based, is based on a transfer function comprising a numerator and a denominator, wherein the numerator comprises a product of a first scalar value and a second scalar value, wherein the denominator comprises the second scalar value and not the first scalar value, wherein the first scalar value and the second scalar value are predetermined and comprise values greater than 0, and wherein the second scalar value is lower than the first scalar value.

12. The apparatus of claim 11, further comprising:

a filter controller configured for setting the second scalar value depending on a bitrate, by which the frequency-time converter is operated, wherein the second scalar value is set to a first value, when the bitrate comprises a first value, wherein the second scalar value is set to a second value, when the bitrate comprises a second value, wherein the second value of the bitrate is lower than the first value of the bitrate, and wherein the second value of the second scalar value is greater than the first value of the second scalar value.

13. The apparatus of claim 11, wherein the first scalar value is set between 0.6 and 1.0 and wherein the second scalar value is set between 0.1 and 0.5.

14. The apparatus of claim 1, wherein the long-term prediction filter, on which the harmonic post-filter is based, comprises a transfer function H(z) in a pole-zero representation based on the following equation:

$$H(z) = \frac{1 - \alpha\beta g B(z, 0)}{1 - \beta g B(z, T_{fr}) z^{-T_{int}}}$$

wherein α is a first scalar value, wherein β is a second scalar value, wherein B(z,0) is a multi-tap filter for a zero fractional part pitch lag, wherein $B(z,T_{fr})$ is the multi-tap filter depending on the fractional part of the pitch lag, wherein $T_{int}$ is the integer part of the pitch lag, wherein $T_{fr}$ is the fractional part of the pitch lag, and wherein g is a gain value indicated by the gain information associated with the audio signal, and wherein z is a variable in a z-plane.

15. The apparatus of claim 1, wherein the harmonic post-filter is configured to comprise a negative spectral tilt for compensating a loss in energy at frequencies between harmonics.

16. The apparatus of claim 1, wherein the domain converter is a frequency-time converter, wherein the first domain is a frequency domain, or wherein the domain converter is an LPC residual-time converter, wherein the first domain is an LPC residual domain.

17. The apparatus of claim 1, wherein the harmonic post-filter is configured to suppress an amount of energy between harmonics in a frame of the audio signal, wherein the amount of energy suppressed is smaller than 20% of a total energy of the time-domain representation in the frame.

18. Apparatus of claim 1, wherein a bitstream comprising the audio signal further comprises a decision bit, and wherein the apparatus is configured, when the decision bit is equal to zero, to not decode any pitch lag information or gain information, or to assume the pitch lag information and the gain information as not written into the bitstream, or to assume the pitch lag indicated by the pitch lag information and a gain indicated by the gain information as a zero value.

19. Apparatus of claim 1, wherein the long-term prediction filter, on which the harmonic post-filter is based, is based on a transfer function comprising a numerator and a denominator, wherein the numerator comprises a gain value indicated by the gain information, and wherein the denominator comprises the integer part of the pitch lag and a multi-tap filter depending on the fractional part of the pitch lag.

20. A method of processing an audio signal, comprising:

converting a first domain representation of the audio signal into a second domain representation of the audio signal, wherein the audio signal being an input signal into the apparatus for processing has associated therewith a pitch lag information and a gain information, wherein the pitch lag information indicates a pitch lag having an integer part and a fractional part; and filtering the second domain representation of the audio signal by a harmonic post-filter, wherein the harmonic post-filter is configured to account for the integer part of the pitch lag indicated by the pitch lag information associated with the audio signal and the fractional part of the pitch lag indicated by the pitch lag information associated with the audio signal.

21. A system for processing an audio signal comprising:

an encoder for encoding the audio signal to obtain an encoded signal; and a decoder for decoding the encoded signal to obtain a decoded audio signal, the decoder comprising a processor, the processor comprising:

a domain converter for converting a first domain representation of the decoded audio signal into a second domain representation of the decoded audio signal, wherein the decoded audio signal being an input signal into the processor has associated therewith a pitch lag information and a gain information, wherein the pitch lag information indicates a pitch lag having an integer part and a fractional part; and a harmonic post-filter for filtering the time-domain representation of the decoded audio signal, wherein the harmonic post-filter is configured to account for the integer part of the pitch lag indicated by the pitch lag information associated with the decoded audio signal and the fractional part of the pitch lag indicated by the pitch lag information associated with the decoded audio signal.

22. The system of claim 21, wherein the encoder comprises:

a pitch lag calculator for calculating the integer part and the fractional part of the pitch lag;

a gain calculator for calculating the gain value; and an encoded signal former for generating the encoded signal comprising the pitch lag information, the pitch lag information having a pitch lag comprising the integer part and the fractional part, and the gain information.

23. A method of processing an audio signal comprising:

a method of encoding the audio signal to obtain an encoded signal; and a method of decoding the encoded signal to obtain a decoded audio signal, the method of decoding comprising a method of processing, the method of processing comprising:

converting a first domain representation of the decoded audio signal into a second domain representation of the decoded audio signal, wherein the decoded audio signal being an input signal into the method for processing has associated therewith a pitch lag information and a gain information, wherein the pitch lag information indicates a pitch lag having an integer part and a fractional part; and filtering the time-domain representation of the decoded audio signal using a harmonic post-filter, wherein the harmonic post-filter is configured to account for the integer part of the pitch lag indicated by the pitch lag information associated with the decoded audio signal and the fractional part of the pitch lag indicated by the pitch lag information associated with the decoded audio signal.

24. A non-transitory digital storage medium having a computer program stored thereon to perform, when said computer program is run by a computer, the method of processing an audio signal having associated therewith a pitch lag information and a gain information, comprising:

converting a first domain representation of the audio signal into a second domain representation of the audio signal, wherein the audio signal being an input signal into the method for processing has associated therewith a pitch lag information and a gain information, wherein the pitch lag information indicates a pitch lag having an integer part and a fractional part; and filtering the time-domain representation of the audio signal by a harmonic post-filter, wherein the harmonic post-filter is configured to account for the integer part of the pitch lag indicated by the pitch lag information associated with the audio signal and the fractional part of the pitch lag indicated by the pitch lag information associated with the audio signal.

25. A non-transitory digital storage medium having a computer program stored thereon to perform, when said computer program is run by a computer, a method of processing an audio signal, the method of processing comprising:

a method of encoding the audio signal to obtain an encoded signal; and a method of decoding the encoded signal to obtain a decoded audio signal, the method of decoding comprising a method of processing, the method of processing comprising:

converting a first domain representation of the decoded audio signal into a second domain representation of the decoded audio signal, wherein the decoded audio signal being an input signal into the method for processing has associated therewith a pitch lag information and a gain information, wherein the pitch lag information indicates a pitch lag having an integer part and a fractional part; and filtering the second domain representation of the decoded audio signal using a harmonic post-filter, wherein the harmonic post-filter is configured to account for the integer part of the pitch lag indicated by the pitch lag information associated with the decoded audio signal and the fractional part of the pitch lag indicated by the pitch lag information associated with the decoded audio signal.

* * * * *